(12) United States Patent
Ucar et al.

(10) Patent No.: US 11,935,310 B2
(45) Date of Patent: Mar. 19, 2024

(54) SYSTEMS AND METHODS TO REGULATE JOINING AND LEAVING A VEHICULAR MICRO CLOUD

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Chang-Heng Wang, Mountain View, CA (US); Enes Krijestorac, Los Angeles, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 192 days.

(21) Appl. No.: 17/155,744

(22) Filed: Jan. 22, 2021

(65) Prior Publication Data

US 2022/0126883 A1    Apr. 28, 2022

Related U.S. Application Data

(60) Provisional application No. 63/106,193, filed on Oct. 27, 2020.

(51) Int. Cl.
*H04W 76/15* (2018.01)
*G06V 20/56* (2022.01)
*H04W 4/46* (2018.01)

(52) U.S. Cl.
CPC ............ *G06V 20/588* (2022.01); *H04W 4/46* (2018.02); *H04W 76/15* (2018.02)

(58) Field of Classification Search
CPC ... H04W 4/46; H04W 28/0215; H04W 76/15; B60W 60/00276; B60W 2554/4049;
(Continued)

(56) References Cited

U.S. PATENT DOCUMENTS 8,296,419 B1 * 10/2012 Khanna ................. G06F 9/5072
718/1
10,587,998 B2    3/2020 Altintas et al.
(Continued)

OTHER PUBLICATIONS

Pannu et al., "Keeping Data Alive: Communication Across Vehicular Micro Clouds," 2019 IEEE 20th International Symposium on "A World of Wireless, Mobile and Multimedia Networks" (WoWMoM), 9 pages.

*Primary Examiner* — Marc Burgess
*Assistant Examiner* — Karen Lynelle Furgason
(74) *Attorney, Agent, or Firm* — Christopher G. Darrow; Darrow Mustafa PC

(57) ABSTRACT

The disclosed subject matter relates to managing a vehicular micro cloud. A method may include determining join/leave protocols for a vehicular micro cloud and transmitting the join/leave protocols to a local vehicle in a vicinity of the vehicular micro cloud prior to the local vehicle joining the vehicular micro cloud. The join/leave protocols can define at least: 1) a procedure for the local vehicle to join the vehicular micro cloud and contribute computing resources to a collaborative micro cloud task, and 2) a protocol for handing an incomplete task when the local vehicle leaves the vehicular micro cloud.

20 Claims, 6 Drawing Sheets

(58) Field of Classification Search
CPC ......... B60W 2554/4045; G05D 1/0027; H04L 67/10; G06V 20/588; G08G 1/207
See application file for complete search history.

(56) References Cited

U.S. PATENT DOCUMENTS

| | | |
|---|---|---|
| 2017/0251339 A1 | 8/2017 | Addepalli et al. |
| 2019/0014446 A1 | 1/2019 | Gade et al. |
| 2019/0025818 A1* | 1/2019 | Mattingly ............. H04L 9/3297 |
| 2019/0079659 A1 | 3/2019 | Adenwala et al. |
| 2019/0222641 A1* | 7/2019 | Schmitt .................. H04L 67/12 |
| 2020/0082727 A1* | 3/2020 | Zhao ..................... G05D 1/0295 |
| 2020/0133307 A1 | 4/2020 | Kelkar et al. |
| 2020/0169605 A1 | 5/2020 | Higuchi et al. |
| 2021/0350707 A1* | 11/2021 | Ucar ..................... H04W 4/021 |
| 2022/0105954 A1* | 4/2022 | Li ....................... B60W 30/165 |

\* cited by examiner

SYSTEMS AND METHODS TO REGULATE JOINING AND LEAVING A VEHICULAR MICRO CLOUD

CROSS-REFERENCE TO PRIORITY APPLICATION

This application claims priority to U.S. Provisional Patent Application No. 63/106,193, filed Oct. 27, 2020, which is commonly assigned herewith and the contents of which are incorporated herein in their entirety by reference, with priority claimed for all commonly disclosed subject matter.

TECHNICAL FIELD

The subject matter described herein relates, in general, to a system and method for regulating join/leave procedures in a vehicular micro cloud, and more particularly, to generating join/leave regulations to advance a specific goal or purpose for a given vehicular micro cloud.

BACKGROUND

Two or more vehicles can establish communications connections (e.g., via vehicle-to-vehicle (V2V) or vehicle-to-everything (V2X) communication protocols) to form a group of interconnected vehicles that are located within a common vicinity. Such groups may be referred to as "vehicular micro clouds." Vehicle members in a vehicular micro cloud (i.e., "members") can have varying levels of computing resources and capabilities, for example, depending on the model/make/year of the vehicle. Members in a vehicular micro cloud can share their computing resources with other members of the micro cloud, for example, to collaborate on operational tasks such as environmental sensing, data downloading/processing, data storage, etc.

Vehicular micro clouds are typically mobile and dynamic, which means members can join and/or leave the vehicular micro cloud at any time. This dynamic nature may degrade the overall performance of the vehicular micro cloud, particularly in collaborative operations that require a so-called ramp up time before effective contributions are possible. For example, a member may join a vehicular micro cloud and prepare for collaboration by downloading data (e.g., from another member or a cloud server) but leave the micro cloud before effectively contributing to completing the task. In another example, a micro cloud member which is currently contributing to an ongoing collaborative task may leave the micro cloud before completing the task and take data associated with the incomplete task from the vehicular micro cloud when it leaves. Such early departures increase delay of task completion and waste computing resources that are available to the vehicular micro cloud often for a limited amount of time.

SUMMARY

The disclosed systems and methods relate to creating and managing join/leave protocols for a vehicular micro cloud as part of managing operations, particularly collaborative operations, in a vehicular micro cloud. By creating and updating join/leave protocols, the disclosed systems and methods can improve member selection, maximize or at least improve application of member resources, and improve hand-offs or subsequent completions of incomplete collaboration tasks.

In one embodiment, a vehicular micro cloud management system includes one or more processors and a memory communicably coupled to the one or more processors. The memory can store a protocol module including instructions that when executed by the one or more processors cause the one or more processors to determine join/leave protocols for a vehicular micro cloud and transmit the join/leave protocols to a local vehicle in a vicinity of the vehicular micro cloud prior to the local vehicle joining the vehicular micro cloud. The join/leave protocols can define at least: 1) a procedure for the local vehicle to join the vehicular micro cloud and contribute computing resources to a collaborative micro cloud task, and 2) a protocol for handing an incomplete task when the local vehicle leaves the vehicular micro cloud.

In another embodiment, a method for managing a vehicular micro cloud includes determining join/leave protocols for a vehicular micro cloud and transmitting the join/leave protocols to a local vehicle in a vicinity of the vehicular micro cloud prior to the local vehicle joining the vehicular micro cloud. The join/leave protocols can define at least: 1) a procedure for the local vehicle to join the vehicular micro cloud and contribute computing resources to a collaborative micro cloud task, and 2) a protocol for handing an incomplete task when the local vehicle leaves the vehicular micro cloud.

In another embodiment, a non-transitory computer-readable medium for managing a vehicular micro cloud includes instructions that, when executed by one or more processors, cause the one or more processors to determine join/leave protocols for a vehicular micro cloud and transmit the join/leave protocols to a local vehicle in a vicinity of the vehicular micro cloud prior to the local vehicle joining the vehicular micro cloud. The join/leave protocols can define at least 1) a procedure for the local vehicle to join the vehicular micro cloud and contribute computing resources to a collaborative micro cloud task, and 2) a protocol for handing an incomplete task when the local vehicle leaves the vehicular micro cloud.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
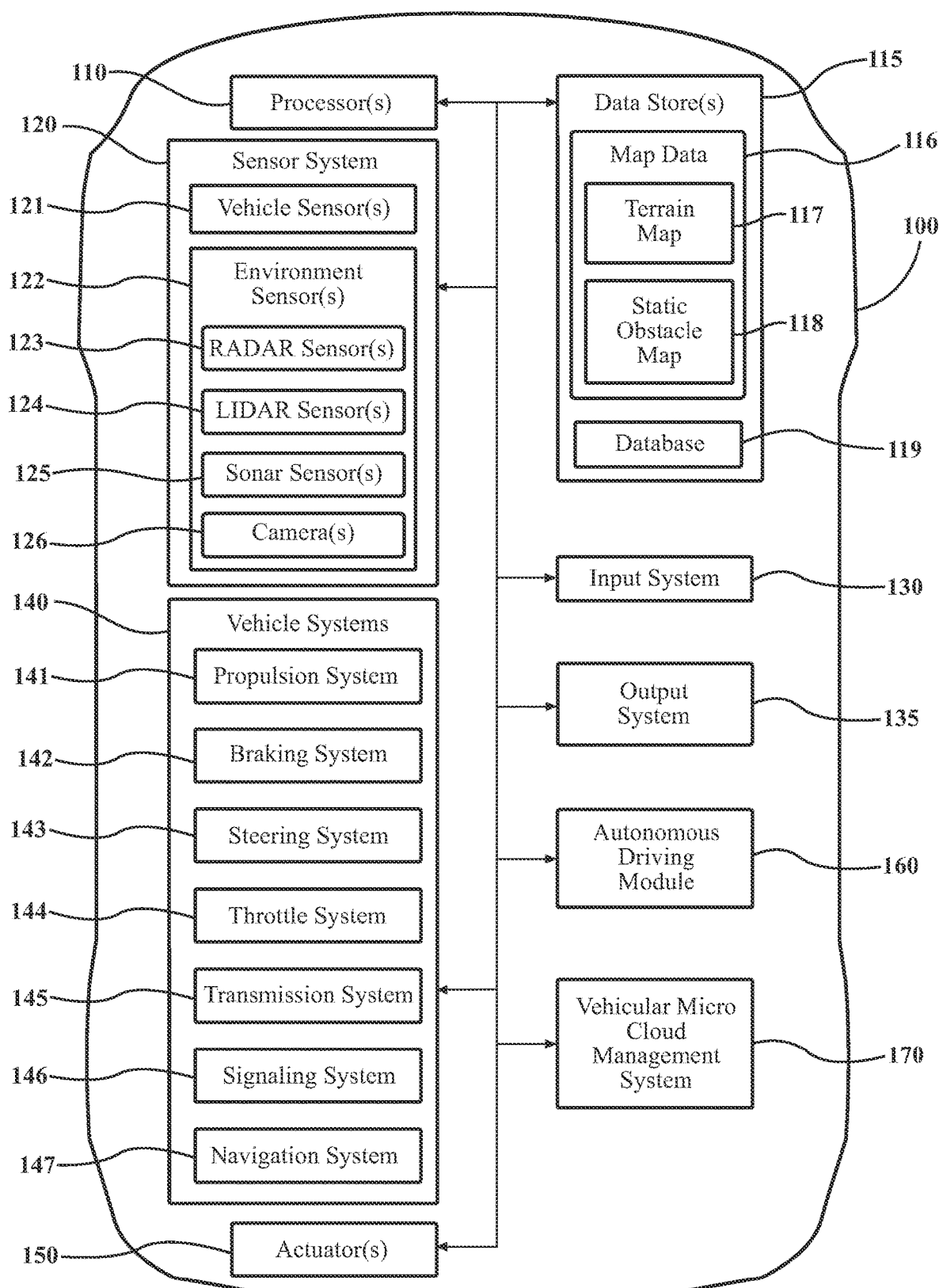
FIG. 1 illustrates one embodiment of a vehicle within which systems and methods disclosed herein may be implemented.

Systems, methods, and embodiments associated with creating and managing join/leave protocols for a vehicular micro cloud are disclosed. As referred to herein, the term "local vehicle" refers to a vehicle that is approaching or within a vicinity of a vehicular micro cloud and is attempting to join the vehicular micro cloud. The term "join/leave protocols" refers to regulations that define one or more of: 1) requirements for when and how the local vehicle may join the vehicular micro cloud, and 2) procedures the local vehicle must complete to join or to leave the vehicular micro cloud.

Generally, a vehicular micro cloud can offer a wide range of collaborative services to its members, for example, by leveraging combined computing resources of multiple members to complete a task. However, the inherently high mobility of vehicle members joining/leaving a vehicular micro cloud as each member travels on its own independent path can result in many inefficient uses of limited time and computing resources in a vehicular micro cloud.

The disclosed vehicular micro cloud management system can reduce inefficient and wasteful collaboration efforts by regulating join/leave protocols of the vehicular micro cloud. In one or more embodiments, the disclosed system can identify a collaboration reason or goal associated with the micro cloud formation. The disclosed system can determine join/leave protocols directed to improve vehicular micro cloud operations and increase efficiency in use of computing resources expended on collaborative goals. By continually managing, updating and regulating the join/leave protocols, the disclosed system reduces wasteful task assignments and dropped tasks and improves overall effectiveness of vehicular micro cloud collaborations.

In one or more embodiments the disclosed vehicular micro cloud management system can determine join/leave protocols for a vehicular micro cloud by applying static regulations based on predefined parameters, or by applying dynamic algorithms based on contextual and situational parameters. In applying static regulation, the disclosed system can implement predetermined rules that are defined and retrieved for join/leave protocols. For example, when traffic density is high in a vicinity of a vehicular micro cloud, a join/leave protocol can include enlarging a backoff time IEEE 802.11p to avoid packet collisions, in addition to hardcoded vehicular micro cloud applications.

In applying dynamic join/leave regulations, the disclosed vehicular micro cloud management system can generate initial join/leave protocols and gradually adjust or update the protocols in part by tracking the environment and overall performance of the vehicular micro cloud. For example, when opposite direction traffics density is high, the disclosed system can generate a leave protocol that leverages opposite direction traffic by allowing members that leave the vehicular micro cloud to store and carry incomplete tasks, thereby providing sufficient time to complete the tasks, and subsequently transmit data associated with the completed task back to the vehicular micro cloud via the opposite direction traffic. Thus, by regulating the join/leave protocols, statically and/or dynamically, the disclosed system can achieve a relatively high task completion ratio and improve overall vehicular micro cloud operations.

Referring to FIG. 1, an example of a vehicle 100 that can implement the disclosed vehicular micro cloud management system 170 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered transport or vehicle that, for example, may form, join or leave vehicular micro clouds and thus can benefit from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2, 3A, 3B, 4 and 5 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a vehicular micro cloud management system 170 that functions to generate and manage join/leave protocols for a vehicular micro cloud. Moreover, while depicted as a standalone component, in one or more embodiments, the vehicular micro cloud management system 170 can be integrated with another component of the vehicle 100, such as the autonomous driving module 160 or other drive control system of the vehicle 100. Furthermore, in one or more embodiments the system 170 can be implemented in a cloud server or edge computing device in communication with the vehicle 100. The disclosed functions and methods will become more apparent in the following discussion of the figures.

Figure 2:
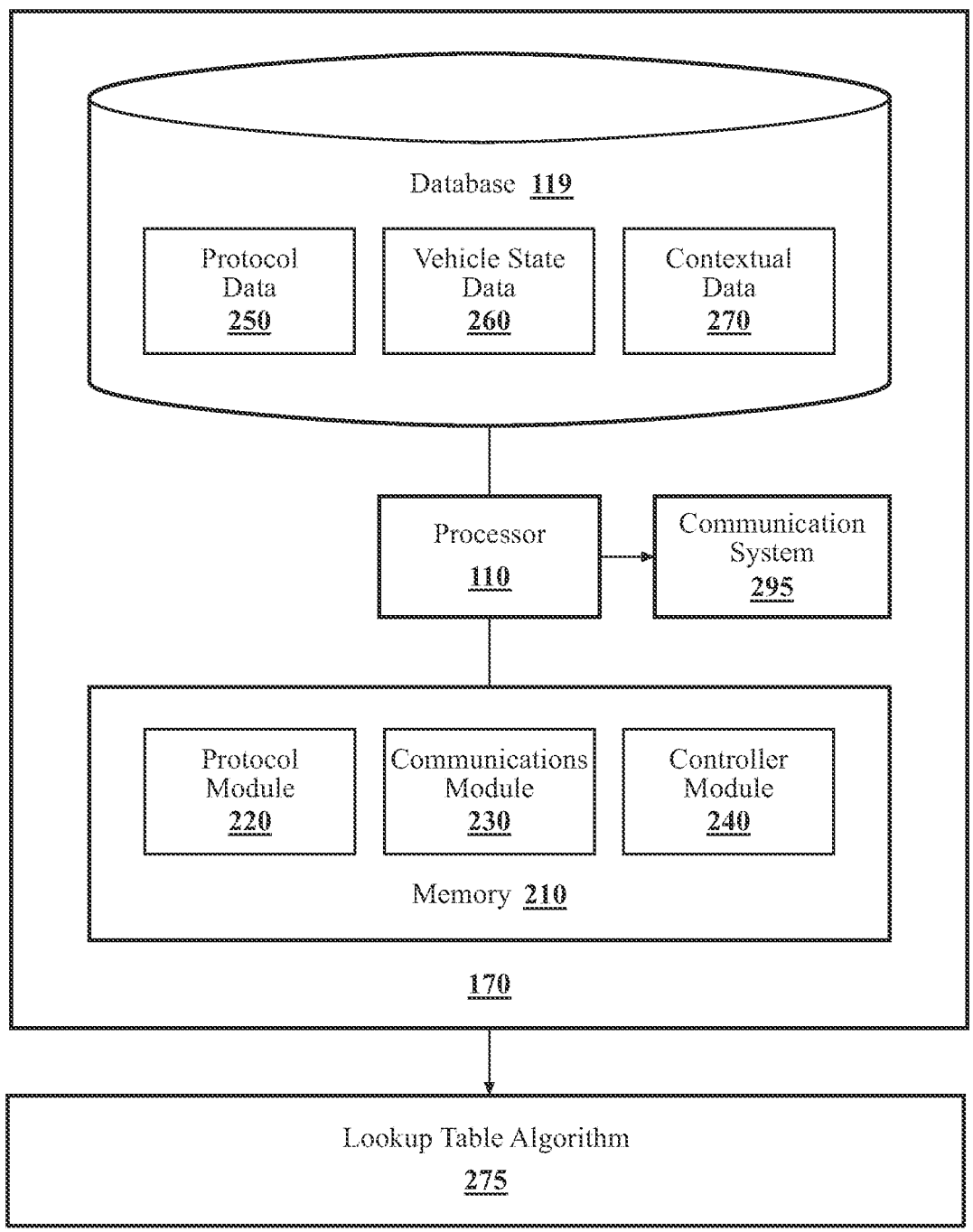
FIG. 2 illustrates one embodiment of a vehicular micro cloud management system, according to the disclosed embodiments.

With reference to FIG. 2, one embodiment of a vehicular implementation of the vehicular micro cloud management system 170 of FIG. 1 is illustrated. The vehicular micro cloud management system 170 is shown as including a processor 110 and a database 119 from the vehicle 100 of FIG. 1. Accordingly, the processor 110 may be a part of the vehicular micro cloud management system 170, the vehicular micro cloud management system 170 may include a processor separate from the processor 110 of the vehicle 100 or the vehicular micro cloud management system 170 may access the processor 110 through a data bus or another communication path.

The vehicular micro cloud management system 170 can include a database 119 that stores, among other things, protocol data 250 (e.g., statically or dynamically determined join/leave protocols), vehicle state data 260 (e.g., computing capabilities, lane position, and destination of a local vehicle, etc.) and contextual data 270 (e.g., map information, traffic information, weather information, etc.), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the vehicular micro cloud management system 170, in one or more embodiments, includes a memory 210 that stores a protocol module 220, a communications module 230, and a controller module 240. The memory 210 can be constructed as a random-access memory (RAM), read-only memory (ROM), a hard-disk drive, a flash memory, or other suitable memory for storing the modules 220, 230, and 240. The modules 220, 230, and 240 are, for example, constructed as computer-readable instructions that when executed by the processor 110 cause the processor 110 to perform the various functions disclosed herein.

The vehicular micro cloud management system 170 can include a communication system 295 to communicate with other vehicles and/or external computing devices, for example, to retrieve vehicle state data 260 and contextual data 270 as will be discussed further below. The communication system 295 can be implemented, for example, as a wireless communication system including one or more transmitting/receiving devices, one or more transmitting/receiving antennas and a controller for transmitting and receiving data over a wireless network using any of a variety of protocols, such as vehicle-to-everything (V2X), general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), Wibree, and/or any other wireless protocol. In one or more embodiments, the communication system 295 can be configured to receive data from one or more external entities, such as other vehicles, road-side units (RSUs), cloud servers, edge servers, stationary cameras, satellites, information servers, etc.

The protocol module 220 is generally constructed including instructions that function to control the processor 110 to generate join/leave protocols for a vehicular micro cloud and transmit the join/leave protocols to a local vehicle in a vicinity of the vehicular micro cloud prior to the local vehicle joining the vehicular micro cloud. The join/leave protocols can be stored as protocol data 250 and can define at least: 1) a procedure for the local vehicle to join the vehicular micro cloud and contribute computing resources to a collaborative micro cloud task, and 2) a protocol for handing an incomplete task when the local vehicle leaves the vehicular micro cloud. The protocol module 220 can generate the join/leave protocols to improve collaborative operations of the vehicular micro cloud.

The communications module 230 is generally constructed including instructions that function to control the processor 110 to obtain state information associated with the local vehicle. The state information can be stored as vehicle state data 260 and can include one or more of actual or predicted computation capability, lane position, and current destination. In one or more embodiments, the protocol module 220 can determine the join/leave protocols based at least in part on the state information, as will be discussed further below.

The controller module 240 is generally constructed including instructions that function to control the processor 110 to identify a collaboration goal for the vehicular micro cloud. In one or more embodiments, the protocol module 220 can determine the join/leave protocols based at least in part on advancing the collaboration goal, as will be discussed further below.

Figure 3A:
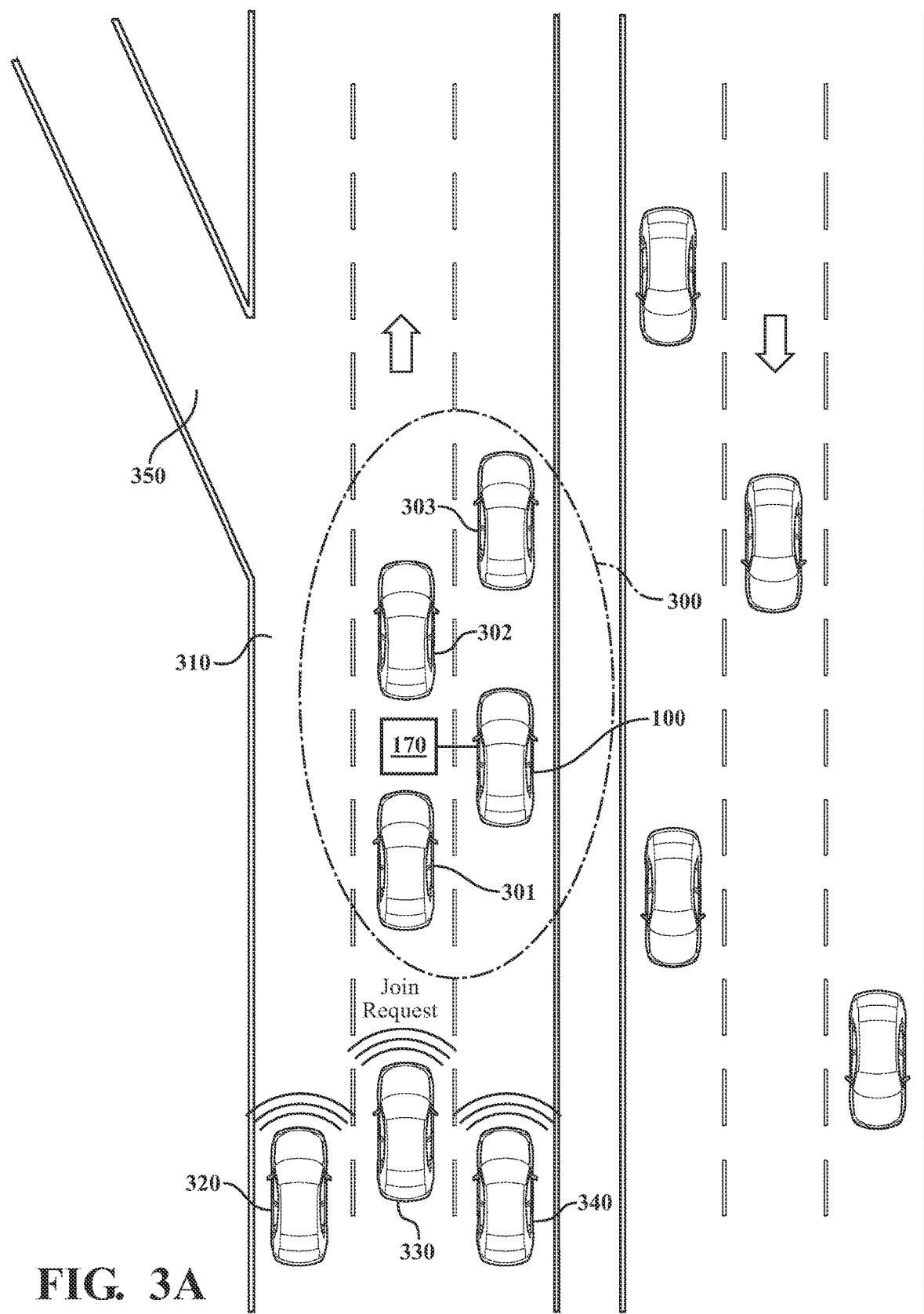
FIG. 3A illustrates an example situation in which the disclosed embodiments can be implemented to generate and manage join/leave protocols for a vehicular micro cloud, according to the disclosed embodiments.

FIG. 3A illustrates an example situation in which the disclosed embodiments can be implemented to generate and manage join/leave protocols for a vehicular micro cloud 300. In this example, the vehicle 100 is the lead vehicle in a vehicle micro cloud 300 traveling on a highway 310. In addition to vehicle 100, the vehicular micro cloud 300 has three other members, 301-303. Three local vehicles, 320, 330, 340, are approaching the vehicular micro cloud 300 and are attempting to join. The local vehicles 320, 330, 340, each transmit a join request to the vehicular micro cloud 300.

In one or more embodiments, the protocol module 220 can determine join/leave protocols with specific procedures for each local vehicle 320, 330, 340, respectively. For example, as a baseline functionality the protocol module 220 can determine and transmit static default join/leave protocols to each local vehicle.

As used herein, "static" join/leave protocols refer to protocols that the vehicular micro cloud management system 170 generates, for an incoming member based on a given set of information, and implements for a duration of time extending from when the member joins the vehicular micro cloud to when the member leaves the vehicular micro cloud. That is, static join/leave protocols can be essentially pre-determined, established, and not change once defined.

Figure 3B:
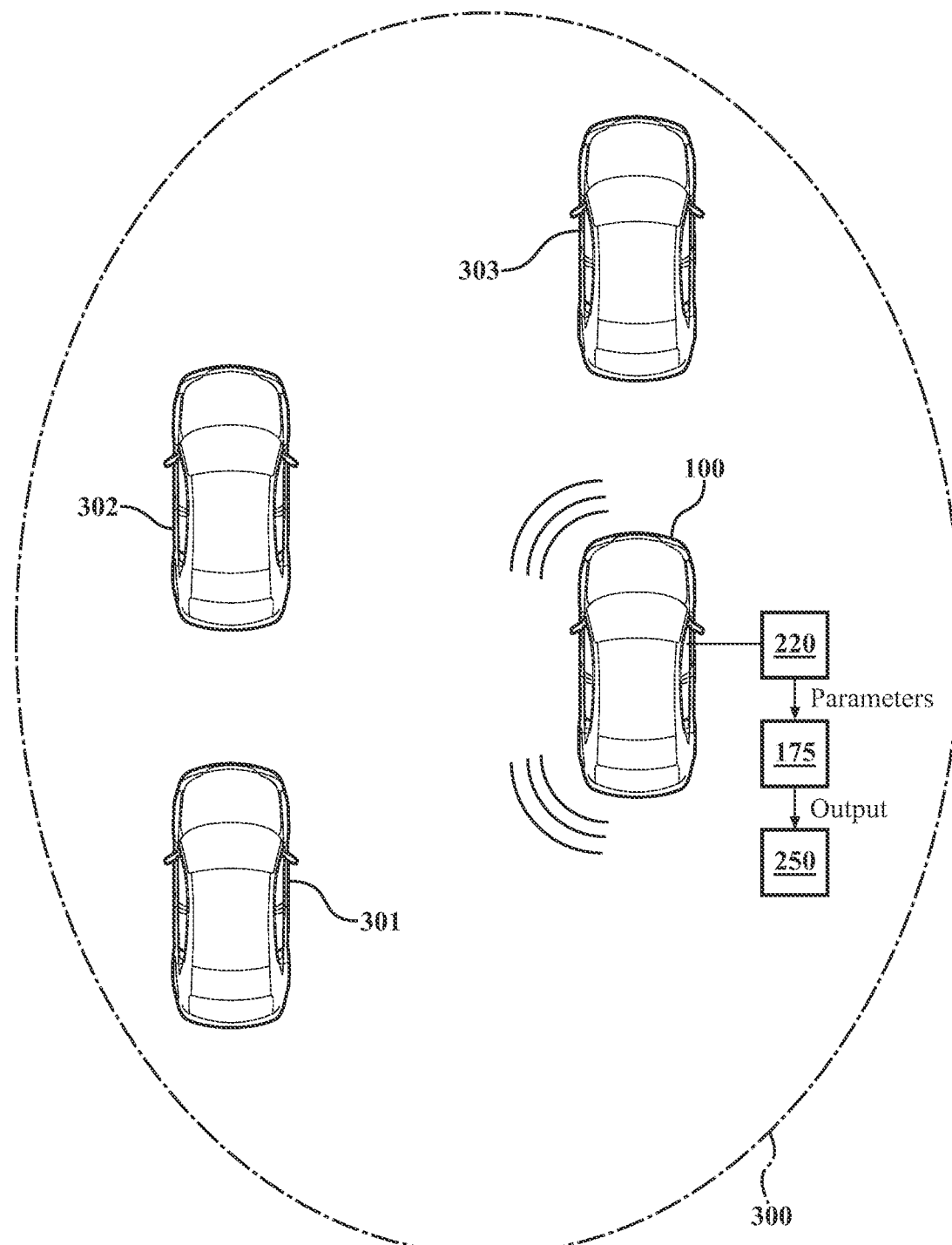
FIG. 3B illustrates an example situation in which the disclosed embodiments can be implemented to generate join/leave protocols, according to the disclosed embodiments.

The protocol module 220 can generate static default join/leave protocols, for example, by using a lookup table algorithm 275 stored in the database 119 or stored outside of the system 170, e.g., in a cloud server or edge server. For example, FIG. 3B illustrates the vehicle 100 determining join/leave protocols during formation of the vehicular micro cloud 300. In one or more embodiments the protocol module 220 can, upon establishing the vehicular micro cloud 300, obtain one or more parameters associated with the vehicular micro cloud 300 formation, such as size, location, or initial collaborative task (e.g., download data for streaming), and input the parameters into a lookup table algorithm 275, which in turn outputs corresponding join/leave protocols. The protocol module 220 can store the join/leave protocols as protocol data 250.

The lookup table algorithm 275 can include multiple predefined join/leave protocols associated with different combinations of micro cloud formation parameters. For example, in one instance the vehicular micro cloud 300 can initially be formed to collaboratively create a 360-degree panoramic view around the vehicular micro cloud 300. The panoramic view can be available for each of the members (100, 301, 302, 303) to increase autonomous environmental awareness and provide driver aid assistance. For this case, example inputs for the algorithm 275 could be: size=4, location=highway, formation_task=panoramic_view. The algorithm 275 can output join/leave protocols associated with this combination of parameters that are beneficial to the formation task.

As an example, the outputted join/leave protocols can include join requirements (e.g., an incoming member must have front and rear facing cameras with a predetermined minimum resolution), join protocols (e.g., the lead vehicle 100 will assign the incoming member a formation position and establish steaming communication with the relevant camera of the incoming vehicle required to fulfill a section of the panoramic view), leave requirements (e.g., a leaving member must transmit a message to the lead vehicle 100 notifying the lead vehicle 100 of the intent of the leaving member to leave and the current formation position of the leaving member in the vehicular micro cloud 300 prior to leaving), and leave protocols (e.g., a leaving member will end the video stream and transmit a final image capture).

It should be understood that these input parameters and join/leave protocols are merely exemplary to facilitate understanding of the disclosed subject matter. More complex and detailed input parameters and join/leave protocols may be implemented. For example, in one or more embodiments the protocol module 220 can obtain contextual information related to one or more additional contextual factors, for example, including number of lanes, weather, traffic density, etc., to increase the parameter inputs to the lookup table algorithm 275. The lookup table algorithm 275 can further include a heuristic to determine a best match join/leave protocol according to the available parameter inputs even if no perfect match exists.

Static join/leave protocols can be determined at a time of formation of the vehicular micro cloud 300 or a time of a local vehicle joining the vehicular micro cloud 300. However, in one or more embodiments the protocol module 220 can implement "dynamic" join/leave protocols, i.e., dynamically determine and, when appropriate, adjust join/leave protocols on an ongoing basis. To accomplish this, the protocol module 220 can obtain additional information from the communications module 230 and/or the controller module 240 to input into the lookup table algorithm 275 for updated join/leave protocols, or directly adjust existing join/leave protocols, for example, due to changed circumstances that affect the vehicular micro cloud 300.

Referring back to FIG. 3A, which shows the vehicular micro cloud 300 established and local vehicles (320, 330, 340) each transmitting requests to join, the communications module 230 can respond to a join request from a local vehicle by requesting state information from the local vehicle. The state information can include various data associated with a predicted or actual current state of the local vehicle, such as overall/available computation capability, download/upload speed, sensor capability and configuration, lane position, and current destination. In one or more embodiments, protocol module 220 can determine static or dynamic join/leave protocols based at least in part on the state information. For example, the lookup table algorithm 275 can include various combinations of state information in association with predefined join/leave protocols, or the protocol module 220 can directly generate or modify a join/leave protocol based in part on the state information and the current needs of the vehicular micro cloud 300.

For example, while the vehicular micro cloud 300 may have initially been formed for a specific collaborative purpose (e.g., create panoramic view), the collaborative purpose may change or multiply over time as the vehicular micro cloud 300 initiates new collaborative tasks (e.g., collaboratively downloading and/or processing data) and completes old ones.

In one or more embodiments, the controller module 240 can identify one or more current collaboration goals for the vehicular micro cloud 300. For example, the controller module 240 can track and monitor the initiation, progress and completion of collaborative tasks undertaken by the vehicular micro cloud 300, as well as the contributions of each micro cloud member to collaborative tasks.

The protocol module 220 can determine static or dynamic join/leave protocols based at least in part on a current collaboration goal and/or current collaboration need, e.g., as identified by the controller module 240. For example, the lookup table algorithm 275 can include various combinations of collaboration goals in association with predefined join/leave protocols, or the protocol module 220 can use a machine learning algorithm to directly generate or modify a join/leave protocol based on the collaboration goal. As another example, the protocol module 220 can set a join requirement of a join/leave protocol based directly on a current collaboration need (i.e., must have high resolution rear camera due to a current need in formation position).

Various example features of the disclosed join/leave protocol related to join procedures will now be discussed, followed by a discussion of features related to leave procedures.

Generally, join procedures address which local vehicle can join the vehicular micro cloud 300 and what process the local vehicle must follow. By regulating join procedures the vehicular cloud management system 170 can improve selection of new members of the vehicular micro cloud 300, improve progression of current vehicular micro cloud operations and collaboration, improve efficiency of on-boarding new members, and improve efficient use and assignment of available computing resources dedicated to vehicular micro cloud operations.

In one or more embodiments, the protocol module 220 can generate a two-stage join procedure as part of the join/leave protocol. For example, the two-stage join procedure can include a waiting stage and full member stage. The join/leave protocol can assign a local vehicle to the waiting stage when conditions or requirements are not completely met for the local vehicle to join the vehicular micro cloud 300 as a full member. For example, in FIG. 3A vehicle 320 may request to join the vehicular micro cloud 300, but only meets some, not all, of the join requirements defined in the join/leave protocol. In this case, the vehicular micro cloud management system 170 can designate the vehicle 320 as a waiting stage vehicle associated with the vehicular micro cloud 300.

As another example scenario, the join/leave protocol may require a joining member to have a download speed of at least 24 mb/sec and a current destination that allows the joining member to spend at least seven minutes in the vehicular micro cloud 300. The vehicle 320 may have download capabilities that exceed the required download speed, but may also have a travel destination that will require the vehicle 320 to exit the highway 310 at the next exit (e.g., exit 350). In this case, the join/leave protocol can require the vehicular micro cloud management system 170 to assign vehicle 320 to the waiting stage.

Local vehicles that are assigned to the waiting stage may have attributes that can be useful to the vehicular micro cloud 300 at a later point in time. Thus, in one or more embodiments the join/leave protocol can include instructions for a waiting stage vehicle to perform preparatory tasks (e.g., download data and/or applications relevant to collaborative tasks) in anticipation of the waiting stage vehicle potentially transitioning to a full member at a future point in time.

The vehicular micro cloud management system 170 can periodically reassess waiting stage vehicles to determine whether they meet new or adjusted join/leave protocols for the vehicular micro cloud 300. For example, as new collaborative tasks are initiated, the needs and purposes of the vehicular micro cloud 300 can change, resulting in changes to the join/leave protocols. If a reassessed waiting stage vehicle meets current join requirements of the join/leave protocols, the vehicular cloud management system 170 can transition the waiting stage vehicle to a full member and transmit the now full member an assignment for a collaborative task of the vehicular micro cloud 300.

Various example features of the disclosed join/leave protocol related to leave procedures will now be discussed. Generally, leave procedures as disclosed herein can improve handoffs and reduce a likelihood of data loss and incomplete tasks being dropped, and thus improve vehicular micro cloud operations overall.

In one or more embodiments, the protocol module 220 can generate leave procedures based at least in part on contextual data 270. The vehicular micro cloud management system 170 can obtain the contextual data 270 from a variety of sources, such as sensor system 120, from V2V communications with other vehicular micro cloud members, or from external servers such as edge servers, cloud servers or the like. The contextual data 270 can indicate information associated with an area or region that the vehicular micro cloud 300 is in, such as traffic density, map information, road conditions, weather conditions, and locations of road-side units or other vehicular micro clouds. Depending on the contextual data 270, different leave procedures may be available.

For example, referring to FIG. 3A, vehicle 303 of the vehicular micro cloud 300 may have access to data indicating a future route the vehicle 303 will take, e.g., based on a navigational system having a current destination entered. The vehicle 303 can transmit the route and destination to the vehicular micro cloud management system 170 as state information during the join process (stored as vehicle state data 260). The vehicular micro cloud management system 170 can obtain contextual data 270 that indicate one or more of: 1) a threshold amount of traffic is traveling along the planned route of the vehicle 303 in the opposite direction and will pass by the vehicular micro cloud 300, 2) the planned route of the vehicle 303 will pass by a participating road-side unit, or 3) the planned route of the vehicle 303 will intersect with another participating vehicular micro cloud. In any of these cases, the join/leave protocol can include a leave procedure that instructs the vehicle 303 to continue to work on its assigned collaborative task and perform piggybacking (i.e., transmitting data back via an intermediary data carrier) after leaving the vehicular micro cloud 300 if a threshold amount of work has already been completed. This type of instruction may be referred to herein as a "store-carry-and-piggyback" protocol.

In a store-carry-and-piggyback protocol, a vehicle that is leaving the vehicular micro cloud 300 will continue its share of a collaborative task to completion and transmit the results back to the vehicular micro cloud 300 by leveraging an intermediary data carrier, such as another participating vehicle that is travelling toward the vehicular micro cloud 300, a road-side unit, another vehicular micro cloud, an edge server, or the like. In this manner the amount of work that a leaving vehicle expended toward a collaborative task during its time in the vehicular micro cloud 300 will not be wasted and overall task completion speed and efficiency of the vehicular micro cloud 300 will increase.

A store-carry-and-piggyback protocol can be implemented by the vehicular micro cloud management system 170 in a dynamically determined join/leave protocol. That is, the availability of this option is contextual and therefore may be dynamically added or removed in an update of the join/leave protocol depending upon the circumstances. If the contextual data 270 indicate that a store-carry-and-piggyback protocol cannot be implemented, the protocol module 220 can create a leave protocol that requires a leaving vehicle to transmit data associated with any incomplete task to the vehicular micro cloud 300, e.g., to the current lead vehicle, in advance of a known upcoming departure.

Figure 4:
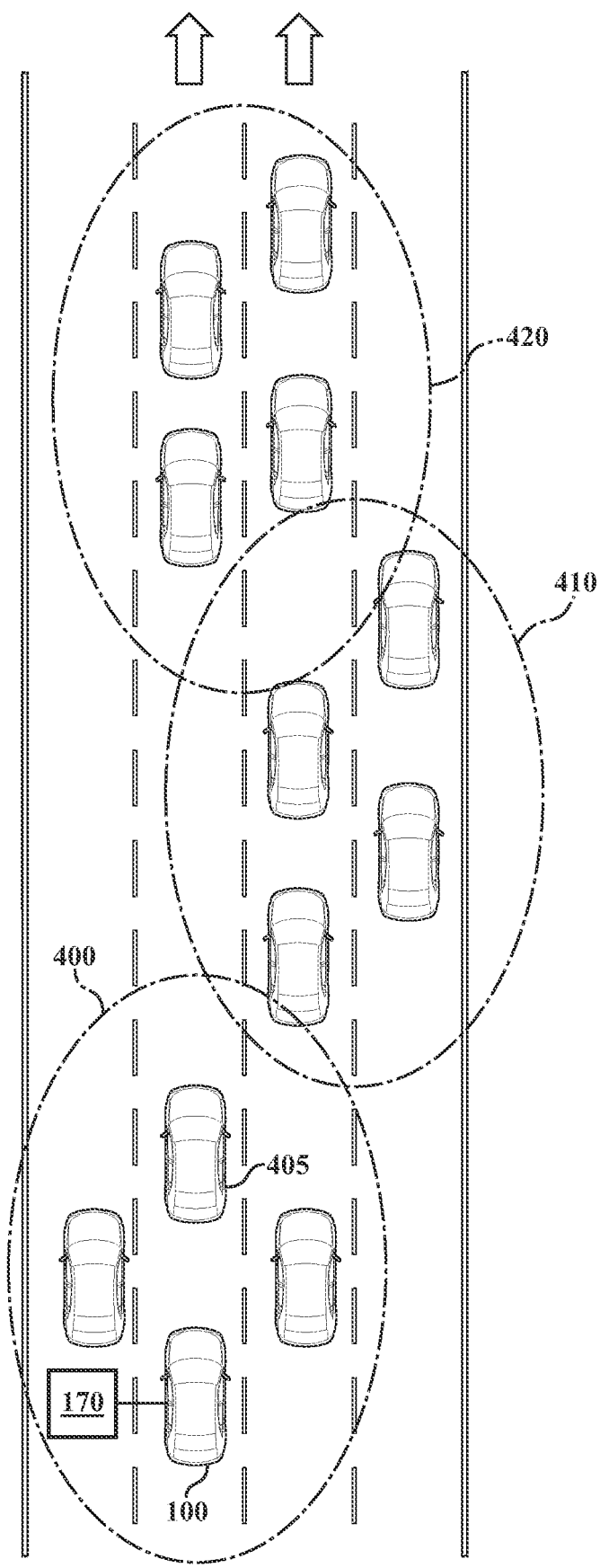
FIG. 4 illustrates an example situation in which the disclosed embodiments can generate join/leave protocols that take advantage of multiple micro clouds in a given vicinity, according to the disclosed embodiments.

FIG. 4 illustrates an example situation in which the disclosed embodiments can generate join/leave protocols that take advantage of multiple or overlapping micro clouds in a given vicinity. A member vehicle 405 may be preparing to leave the vehicular micro cloud 400. The contextual data 270 may indicate that multiple other vehicular micro clouds 410, 420 are in the vicinity with overlapping communicative ranges. The protocol module 220 can leverage the presence of the other vehicular micro clouds 410, 420 in generating leave procedures of the join/leave protocols. For example, the leave procedures can instruct the vehicle 405 to store-carry-and-piggyback incomplete tasks that the vehicle 405 is still working on until completion and transmit data associated with the completed task back to the vehicular micro cloud 400 via the other vehicular micro clouds 410, 420.

Thus, the disclosed vehicular micro cloud management system 170 can significantly increase operational efficiency in one or more vehicular micro clouds by generating, implementing, and managing join/leave protocols that improve the selection (e.g., fitness per current needs) and preparedness of joining vehicles (e.g., via a two-stage entry process) and that reduce dropped tasks and wasted resources (e.g., via store-carry-and-piggyback protocols, overlapping micro clouds, etc.). Additional and optional features of the vehicular micro cloud management system 170 will be discussed below.

Figure 5:
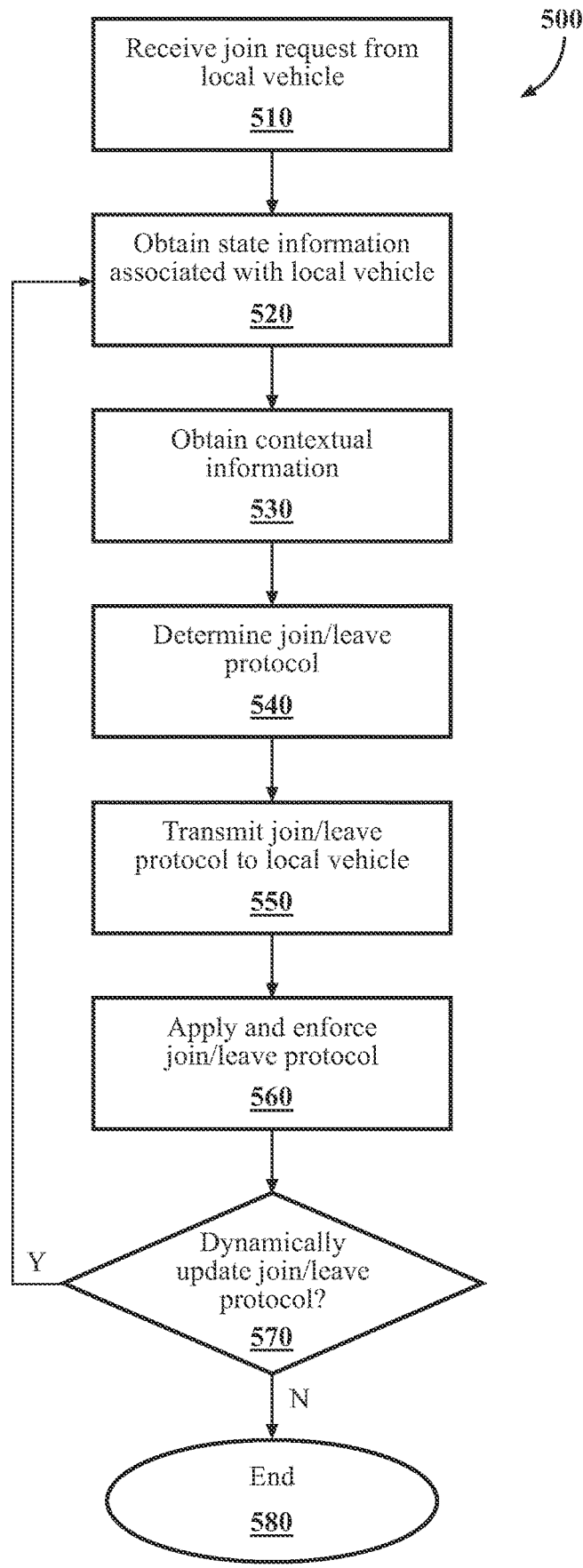
FIG. 5 illustrates an example flowchart of operations of a vehicular micro cloud management system, according the disclosed embodiments.

FIG. 5 illustrates a flowchart of a method 500 of managing a vehicular micro cloud according to the disclosed embodiments. Method 500 will be discussed from the perspective of the vehicular micro cloud management system 170 of FIGS. 1 and 2. While method 500 is discussed in combination with the vehicular micro cloud management system 170, it should be appreciated that the method 500 is also not limited to being implemented within the vehicular micro cloud management system 170 but is instead one example of a system that may implement the method 500. Furthermore, in various implementations some of the operations may be executed in a different order from the order in which they are discussed or optionally omitted.

At operation 510, the vehicular micro cloud management system 170 receives a join request from a local vehicle in a vicinity of the vehicular micro cloud. For example, the vehicular micro cloud management system 170 can be implemented in vehicle 100 functioning as a lead of the vehicular micro cloud and the local vehicle can transmit the request to the vehicle 100 using a V2V communication message.

At operation 520, the vehicular micro cloud management system 170 (e.g., the communications module 230) can obtain state information associated with the local vehicle. The state information can include, for example, one or more of computation capability, lane position, download speed, sensor configuration and current destination. In one or more embodiments the communications module 230 can request and receive the state information from the local vehicle via V2V communication and store the state information as vehicle state data 260 to be available for future use.

At operation 530, the vehicular micro cloud management system 170 (e.g., the controller module 240) can identify a collaboration goal for the vehicular micro cloud. For example, the collaboration goal can be an initial goal that prompted formation of the vehicular micro cloud or a new goal initiated after formation of the vehicular micro cloud.

At operation 540, the vehicular micro cloud management system 170 (e.g., the protocol module 220) can generate join/leave protocols that will apply for the local vehicle, and in some instances that will also apply to vehicles that are already in the vehicular micro cloud. For example, in one or more embodiments, the protocol module 220 can determine blanket join/leave protocols that apply to all vehicles currently in or joining the vehicular micro cloud. Alternatively, in one or more embodiments, the protocol module 220 can generate individual join/leave protocols per vehicle based on available data associated with each vehicle. For example, in one or more embodiments, the protocol module 220 can determine the join/leave protocols for a given vehicle based at least in part on the state information associated with the given vehicle.

In generating join/leave protocols for an individual vehicle, the protocol module 220 can also utilize ancillary information, such as information indicating an estimate as to how long the individual vehicle will remain in or near the vehicular micro cloud, or characteristics of the individual vehicle and/or driver. For example, in one or more embodiments the vehicular micro cloud can collect driving data (e.g., speed, lane changes, acceleration, etc.) associated with the individual vehicle, e.g., from sensors equipped on member vehicles of the vehicular micro cloud, and classify the driver temperament or style based on the driving data. The join/leave protocol can filter out aggressive or fast drivers that may not be efficient matches for vehicular micro cloud operations, for example, by including join requirements that require a vehicle to travel at a speed similar to that of the vehicular micro cloud or not execute multiple lane changes.

Furthermore, in one or more embodiments the protocol module 220 can further generate or modify join/leave protocols based at least in part on contextual information and/or identified collaboration goals. The protocol module 220 can include or access a lookup table algorithm 275 or other type of algorithm (e.g., a machine learning algorithm) configured to receive inputs of any combination of various types of data as discussed above, including vehicle state data 260, contextual data 270, and collaboration goals, and output join/leave protocols that improve the efficiency of member selection and collaborative operation of the vehicular micro cloud as disclosed herein.

The protocol module 220 can generate the join/leave protocols to include at least join procedures and leave procedures. The join procedures can include join requirements and a two-stage process for vehicles that may meet some but not all of the join requirements. The leave procedures can include instructions for handing off incomplete tasks, such as store-carry-and-piggyback instructions.

At operation 550, the vehicular micro cloud management system 170 (e.g., the protocol module 220) can transmit the join/leave protocols to a local vehicle in a vicinity of the vehicular micro cloud. In one or more embodiments, the protocol module 220 can transmit the join/leave protocol prior to the local vehicle joining the vehicular micro cloud.

At operation 560, the vehicular micro cloud management system 170 (e.g., the protocol module 220) can apply or enforce the join/leave protocols. In one or more embodiments the protocol module 220 can apply or enforce the join/leave protocols by determining whether requirements defined in the join/leave protocols, such as join requirements, are met by the local vehicle and setting the membership status of the local vehicle accordingly. For example, in one or more embodiments the join requirements may define a two-stage entry process for vehicles that do not meet all of the current join requirements defined by the join/leave protocols. Based on the join requirements, the protocol module 220 can reject a join request from a local vehicle, place a local vehicle in a waiting stage, or accept the join request and assign the local vehicle a membership position in the vehicular micro cloud. The protocol module 220 can assign preparatory tasks to vehicles that are in the waiting stage, and collaborative tasks to vehicles that are full members of the vehicular micro cloud.

At operation 570, the vehicular micro cloud management system 170 (e.g., the protocol module 220) can determine whether to dynamically generate new join/leave protocols and/or update existing join/leave protocols. For example, in one or more embodiments, the protocol module 220 can periodically (e.g., every three minutes, upon each new join request, upon each change in contextual data 270 beyond a threshold amount, etc.) update the join/leave protocols based on current information (e.g., current contextual data 270, current vehicle state data 260 associated with waiting stage vehicles, current collaboration goals or needs, etc.). When the protocol module 220 determines to update the join/leave protocols, the process cycles back to operation 520.

In any update cycle, the operations can be performed for all relevant vehicles. For example, at operation 520, the communications module 230 can obtain state information from all new local vehicles as well as all waiting stage vehicles, at operation 540 the protocol module 220 can adjust or update join/leave protocols for all local vehicles, waiting stage vehicles, full member vehicles, and so on. When the vehicular micro cloud management system 170 no longer needs to generate or update join/leave protocols (e.g., the vehicular micro cloud has dispersed), the process ends at 580.

Accordingly, the disclosed vehicular micro cloud management system 170 can continually improve join/leave protocols for a vehicular micro cloud and continually increase and operational efficiency of the vehicular micro cloud.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, road-side unit locations, traffic control devices, road markings, structures, obstructions, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high definition, high quality and/or highly detailed in one or more areas, and have one or more areas that have less detail, information or quality than the one or more high quality areas.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof and can also be included in the contextual data 270. For example, the one or more environment sensors 122 can be configured to detect, quantify and/or sense obstacles in at least a portion of the external environment of the vehicle 100 and/or information/ data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, or arrangement or groups thereof that enable information/data to be presented to a vehicle passenger (e.g., a person, a vehicle passenger, etc.). The output system 135 can function as part of an interface that can present, for example, predicted states of detected objects.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can be operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vehicular micro cloud management system 170, and/or the autonomous driving module(s) 160 can be operatively connected to communicate with the various vehicle systems 140 and/or individual components thereof. For example, returning to FIG. 1, the processor(s) 110, the vehicular micro cloud management system 170, and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to communicate with and/or control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100 in response to or based at least in part on predicted states of objects as provided by the vehicular micro cloud management system 170. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. The vehicular micro cloud management system 170 can determine one or more actuation commands for one or more of the actuators 150 on a per wheel basis, as discussed above.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vehicular micro cloud management system 170 can be configured to determine travel path(s) and determine current autonomous driving maneuvers for the vehicle 100, future autonomous driving maneuvers and/or modifications to current autonomous driving maneuvers based on data and/or predictions acquired by the sensor system 120 and/or vehicular micro cloud management system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement a variety of driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1, 2, 3A, 3B, 4 and 5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicular micro cloud management system, comprising:
    one or more processors disposed on a vehicle; and
    a memory disposed on a vehicle and communicably coupled to the one or more processors, storing:
        a protocol module including instructions that when executed by the one or more processors cause the one or more processors to determine:
            change in membership parameters for a vehicular micro cloud and transmit the change in membership parameters to a local vehicle in a vicinity of the vehicular micro cloud prior to the local vehicle joining the vehicular micro cloud;
            wherein the change in membership parameters define at least:
                1) A procedure for the local vehicle to join the vehicular micro cloud and to contribute computing resources to a collaborative micro cloud task, and
                2) A protocol for handling an incomplete task when the local vehicle leaves the vehicular micro cloud in order to preserve data associated with the incomplete task to reduce waste of use of computing resources of the vehicular micro cloud, wherein the protocol for handling the incomplete task includes:
                    the local vehicle completing the incomplete task after leaving the vehicular micro cloud, resulting in a completed task, and
                    the local vehicle transmitting data associated with the completed task back to the vehicular micro cloud via a secondary vehicle traveling in an opposite direction toward the vehicular micro cloud; and
                in response to the vehicle participating in the collaborative micro cloud task, whether to allow the local vehicle to join the vehicular micro cloud based on an assessment of an ability of the local vehicle to comply with the protocol for handling the incomplete task,
    wherein the change in membership parameters comprise at least one of join requirements, join protocols, leave requirements, or leave protocols.

2. The system of claim 1, wherein the memory further stores a communications module including instructions that when executed by the one or more processors cause the one or more processors to obtain state information associated with the local vehicle,
    wherein the instructions to determine the change in membership parameters include instructions to determine the change in membership parameters based at least in part on the state information.

3. The system of claim 2, wherein the state information includes one or more of actual or predicted: computation capability, lane position, download speed, sensor configuration or current destination.

4. The system of claim 3, wherein the change in membership parameters include at least one requirement that must be met by the local vehicle prior to joining the vehicular micro cloud, the at least one requirement comprising one or more of a required computation capability, required sensor capability, required lane position, or required amount of time that the local vehicle will be in the vicinity of the vehicular micro cloud.

5. The system of claim 1, wherein the memory further stores a controller module including instructions that when executed by the one or more processors cause the one or more processors to identify a collaboration goal for the vehicular micro cloud,
    wherein the instructions to determine the change in membership parameters include instructions to determine the change in membership parameters based at least in part on advancing the collaboration goal.

6. The system of claim 1, wherein the procedure for the local vehicle to join the vehicular micro cloud includes downloading a threshold amount of data associated with the collaborative micro cloud task.

7. The system of claim 1, wherein at least one join protocol or leave protocol, of the at least one of the join requirements, the join protocols, the leave requirements, or the leave protocols, includes enlarging a backoff time to avoid a packet collision.

8. The system of claim 7, wherein the enlarging the backoff time to avoid the packet collision comprises enlarging, in response to a determination that a density of traffic in the vicinity of the vehicular micro cloud is greater than a threshold density, the backoff time to avoid the packet collision.

9. The system of claim 1, wherein the transmitting the data associated with the completed task back to the vehicular micro cloud via the secondary vehicle traveling in the opposite direction toward the vehicular micro cloud comprises transmitting, in response to a determination that a density of traffic traveling in the opposite direction toward the vehicular micro cloud is greater than a threshold density, the data associated with the completed task back to the vehicular micro cloud via the secondary vehicle traveling in the opposite direction toward the vehicular micro cloud.

10. A method for managing a vehicular micro cloud, comprising:
  determining, by a processor disposed on a vehicle, change in membership parameters for a vehicular micro cloud;
  causing, by the processor, a transmission of the change in membership parameters to a local vehicle in a vicinity of the vehicular micro cloud prior to the local vehicle joining the vehicular micro cloud;
  wherein the change in membership parameters define at least:
    1) A procedure for the local vehicle to join the vehicular micro cloud and to contribute computing resources to a collaborative micro cloud task, and
    2) A protocol for handling an incomplete task when the local vehicle leaves the vehicular micro cloud in order to preserve data associated with the incomplete task to reduce waste of use of computing resources of the vehicular micro cloud, wherein the protocol for handling the incomplete task includes:
      the local vehicle completing the incomplete task after leaving the vehicular micro cloud, resulting in a completed task, and
      the local vehicle transmitting data associated with the completed task back to the vehicular micro cloud via a secondary vehicle traveling in an opposite direction toward the vehicular micro cloud; and
  determining, by the processor, in response to the vehicle participating in the collaborative micro cloud task, whether to allow the local vehicle to join the vehicular micro cloud based on an assessment of an ability of the local vehicle to comply with the protocol for handling the incomplete task,
  wherein the change in membership parameters comprise at least one of join requirements, join protocols, leave requirements, or leave protocols.

11. The method of claim 10, further comprising obtaining state information associated with the local vehicle, wherein the determining the change in membership parameters includes determining the change in membership parameters based at least in part on the state information.

12. The method of claim 11, wherein the state information includes one or more of actual or predicted: computation capability, lane position, download speed, sensor configuration or current destination.

13. The method of claim 12, wherein the change in membership parameters include at least one requirement that must be met by the local vehicle prior to joining the vehicular micro cloud, the at least one requirement comprising one or more of a required computation capability, required sensor capability, required lane position, or required amount of time that the local vehicle will be in the vicinity of the vehicular micro cloud.

14. The method of claim 10, further comprising identifying a collaboration goal for the vehicular micro cloud, wherein the determining the change in membership parameters includes determining the change in membership parameters based at least in part on advancing the collaboration goal.

15. The method of claim 10, wherein the procedure for the local vehicle to join the vehicular micro cloud includes downloading a threshold amount of data associated with the collaborative micro cloud task.

16. A non-transitory computer-readable medium for managing a vehicular micro cloud, including instructions that, when executed by one or more processors disposed on a vehicle, cause the one or more processors to:
  determine change in membership parameters for a vehicular micro cloud;
  cause a transmission of the change in membership parameters to a local vehicle in a vicinity of the vehicular micro cloud prior to the local vehicle joining the vehicular micro cloud;
  wherein the change in membership parameters define at least:
    1) A procedure for the local vehicle to join the vehicular micro cloud and to contribute computing resources to a collaborative micro cloud task, and
    2) A protocol for handling an incomplete task when the local vehicle leaves the vehicular micro cloud in order to preserve data associated with the incomplete task to reduce waste of use of computing resources of the vehicular micro cloud, wherein the protocol for handling the incomplete task includes:
      the local vehicle completing the incomplete task after leaving the vehicular micro cloud, resulting in a completed task, and
      the local vehicle transmitting data associated with the completed task back to the vehicular micro cloud via a secondary vehicle traveling in an opposite direction toward the vehicular micro cloud; and
  determine, in response to the vehicle participating in the collaborative micro cloud task, whether to allow the local vehicle to join the vehicular micro cloud based on an assessment of an ability of the local vehicle to comply with the protocol for handling the incomplete task,
  wherein the change in membership parameters comprise at least one of join requirements, join protocols, leave requirements, or leave protocols.

17. The non-transitory computer-readable medium of claim 16, further comprising instructions to obtain state information associated with the local vehicle and wherein the instructions to determine the change in membership parameters include instructions to determine the change in membership parameters based at least in part on the state information.

18. The non-transitory computer-readable medium of claim 17, wherein the state information includes one or more of actual or predicted: computation capability, lane position, download speed, sensor configuration or current destination.

19. The non-transitory computer-readable medium of claim 18, wherein the change in membership parameters include at least one requirement that must be met by the local vehicle prior to joining the vehicular micro cloud, the at least one requirement comprising one or more of a required computation capability, required sensor capability, required lane position, or required amount of time that the local vehicle will be in the vicinity of the vehicular micro cloud.

20. The non-transitory computer-readable medium of claim 16, further comprising instructions to identify a collaboration goal for the vehicular micro cloud and wherein the instructions to determine the change in membership parameters include instructions to determine the change in membership parameters based at least in part on advancing the collaboration goal.

* * * * *